US012712588B2

(12) United States Patent
Wu

(10) Patent No.: US 12,712,588 B2
(45) Date of Patent: Aug. 18, 2026

(54) TIGHTNESS SELF-CHECKING DEVICE FOR WATERPROOF MOBILE PHONE PROTECTIVE CASE AND METHOD THEREOF

(71) Applicant: Dongguan Shenhai Sporting Goods Co., Ltd, Guangdong (CN)

(72) Inventor: Zhidong Wu, Guangdong (CN)

(73) Assignee: Dongguan Shenhai Sporting Goods Co., Ltd, Guangdong (CN)

( * ) Notice: Subject to any disclaimer, the term of this patent is extended or adjusted under 35 U.S.C. 154(b) by 306 days.

(21) Appl. No.: 18/407,454

(22) Filed: Jan. 9, 2024

(65) Prior Publication Data

US 2025/0096834 A1 Mar. 20, 2025

(30) Foreign Application Priority Data

Sep. 15, 2023 (CN) ........................ 202311200283.X

(51) Int. Cl.
*H04B 1/3888* (2015.01)
*H04B 1/38* (2015.01)

(52) U.S. Cl.
CPC ... *H04B 1/3888* (2013.01); *H04B 2001/3894* (2013.01); *Y02A 30/00* (2018.01)

(58) Field of Classification Search
CPC ..................... H04B 1/3888; H04B 2001/3894; H04M 1/18
See application file for complete search history.

(56) References Cited

U.S. PATENT DOCUMENTS 4,763,145 A * 8/1988 Takamura .............. G03B 17/08 396/26
5,870,632 A * 2/1999 Ho ......................... G03B 17/18 396/26
6,625,394 B2 * 9/2003 Smith .................... G03B 17/08 116/213
6,636,697 B2 * 10/2003 Smith .................... G03B 17/08 396/29
9,369,556 B1 * 6/2016 Wang ................ H04M 1/72463
9,667,297 B1 * 5/2017 Miehl .................. H05K 5/0215
10,408,703 B2 * 9/2019 Kil ...................... G01M 3/3272
(Continued)

FOREIGN PATENT DOCUMENTS

CN 108113156 6/2018
EP 2846516 A1 * 3/2015 ........... H04B 1/3888

*Primary Examiner* — Lewis G West
(74) *Attorney, Agent, or Firm* — JCIPRNET

(57) ABSTRACT

A tightness self-checking device for a waterproof mobile phone protective case, which includes a waterproof mobile phone case cavity. A front-mounted mobile phone case is provided on the front side of the cavity of the waterproof mobile phone case. The lower part of the front-mounted mobile phone case is provided with an opening. A tightness self-checking mechanism is mounted inside the opening. An engagement mechanism is mounted at the front edge of the cavity of the waterproof mobile phone case. The tightness self-checking mechanism includes a pressing frame, a fixing frame and a front transparent soft film. A foldable soft rubber cavity is fixedly connected to the front side of the fixing frame. A pressing plate is fixedly connected to the front side of the foldable soft rubber cavity. The front transparent soft film is mounted on the inner rear side of the front-mounted mobile phone case.

7 Claims, 7 Drawing Sheets

(56) References Cited

U.S. PATENT DOCUMENTS

| | | | | |
|---|---|---|---|---|
| 10,852,770 | B2 * | 12/2020 | Ichikawa | G04B 47/066 |
| 2012/0243854 | A1 * | 9/2012 | Takimoto | G03B 17/08<br>396/26 |
| 2012/0314354 | A1 * | 12/2012 | Rayner | G06F 1/1656<br>361/679.01 |
| 2015/0070180 | A1 * | 3/2015 | Aotake | G01M 3/26<br>340/626 |
| 2015/0172798 | A1 * | 6/2015 | Chao | H04M 1/03<br>381/334 |
| 2016/0021771 | A1 * | 1/2016 | Zhang | G06F 1/163<br>361/752 |
| 2016/0269530 | A1 * | 9/2016 | Berggren | H04W 4/12 |
| 2017/0041036 | A1 * | 2/2017 | Phung | H04W 88/02 |
| 2020/0359145 | A1 * | 11/2020 | Kim | G10L 25/51 |
| 2021/0086881 | A1 * | 3/2021 | Wang | H04W 4/80 |

* cited by examiner

TIGHTNESS SELF-CHECKING DEVICE FOR WATERPROOF MOBILE PHONE PROTECTIVE CASE AND METHOD THEREOF

CROSS-REFERENCE TO RELATED APPLICATION

This application claims the priority benefit of China application serial no. 202311200283.X, filed on Sep. 15, 2023. The entirety of the above-mentioned patent application is hereby incorporated by reference herein and made a part of this specification.

BACKGROUND

Technical Field

The present invention relates to the technical field of mobile phone accessories, and in particular to a tightness self-checking device for a waterproof mobile phone protective case and a method thereof.

Description of Related Art

In order to prevent a mobile phone from being damaged due to collision, falling or water inflow, a mobile phone protective case is usually put on the outside of the mobile phone to protect it. The use of mobile phone protective cases is becoming increasingly widespread. The role of mobile phone protective cases has also evolved from protecting mobile phones to being used for aesthetic purposes. Its types have also diversified with the increase in mobile phone brands and functions. However, in actual use, it is found that there are still many deficiencies in its own structure and performance.

Chinese invention patent CN108113156A discloses a waterproof mobile phone protective case and a waterproof method. The waterproof mobile phone protective case includes: a casing, with at least one through hole provided in the casing; an elastic piece, which is provided at the through hole and is used for ejecting to seal the through hole; an elastic piece controller, which is provided on the casing and is used for controlling the ejection and retraction of the elastic piece; a sensing means, which is provided on the surface of the casing and is used for sensing whether water has entered the casing and send a signal when water enters the casing; and a control center, wherein the elastic piece controller and the sensing means are electrically connected to the control center respectively, and the control center is used for receiving a signal sent by the sensing means and issue instructions to the elastic piece controller to control the elastic piece to eject to seal the through hole without manual control, which can intelligently provide waterproof protection for mobile phones, with good waterproof protection performance and convenient control. However, there are still deficiencies in the above-mentioned waterproof mobile phone protective case. That is, the waterproof mobile phone protective case does not have a tightness self-checking device for self-checking the waterproof tightness of the waterproof mobile phone protective case when the waterproof mobile phone protective case is used, so that it is still used due to the inability to make an accurate judgment in time, resulting in mobile phone damage by water inflow. Therefore, it is necessary to better improve the effective utilization of waterproof mobile phone case products.

SUMMARY

The purpose of the present invention is to provide a tightness self-checking device for a waterproof mobile phone protective case and method thereof, so as to solve the problems mentioned in the above background art: there are still deficiencies in the waterproof mobile phone protective case, that is, the waterproof mobile phone protective case does not have a tightness self-checking device for self-checking the waterproof tightness of the waterproof mobile phone protective case when the waterproof mobile phone protective case is used, so that it is still used due to the inability to make an accurate judgment in time, resulting in mobile phone damage by water inflow. Therefore, it is necessary to better improve the effective utilization of waterproof mobile phone case products.

To achieve the above object, the present invention provides a technical solution as follows: a tightness self-checking device for a waterproof mobile phone protective case, comprising a waterproof mobile phone case cavity, wherein a front-mounted mobile phone case is provided on the front side of the waterproof mobile phone case cavity, the lower part of the front-mounted mobile phone case is provided with an opening, a tightness self-checking mechanism is mounted inside the opening, and an engagement mechanism is mounted at the front edge of the waterproof mobile phone case cavity; and the tightness self-checking mechanism comprises a pressing frame, a fixing frame and a front transparent soft film, the pressing frame is placed inside the opening, a plurality of retaining grooves are equidistantly provided in the front periphery of the pressing frame, the retaining grooves are all engaged with buckles, the buckles are all buckled at the inner edge of the fixing frame, a foldable soft rubber cavity is fixedly connected to the front side of the fixing frame, a pressing plate is fixedly connected to the front side of the foldable soft rubber cavity, and a front transparent soft film is mounted on the inner rear side of the front-mounted mobile phone case.

As a preferred technical solution of the present invention, the engagement mechanism comprises an edge-retaining ring, the edge-retaining ring is mounted at the front edge of the waterproof mobile phone case cavity, the edge-retaining ring is engaged with an edge-retaining groove, and the edge-retaining groove is provided at the rear edge of the front-mounted mobile phone case.

As a preferred technical solution of the present invention, an air squeeze space is formed between the foldable soft rubber cavity and the front transparent soft film.

As a preferred technical solution of the present invention, the pressing plate, the foldable soft rubber cavity, and fixing frame are arranged in sequence in front and back.

As a preferred technical solution of the present invention, the retaining grooves and the buckles are rotationally connected.

As a preferred technical solution of the present invention, the front transparent soft film is squeezed by the foldable soft rubber cavity, thus bulging and contacting a mobile phone.

As a preferred technical solution of the present invention, a bottom groove is provided in the middle of the bottom surface of the front-mounted mobile phone case, a nail rod is provided inside the bottom groove, the nail rod is rotatably connected to one side of a movable arc buckle, the other side of the movable arc buckle is mounted with a square buckle, elastic columns are mounted on the sides away from the square buckle, springs are sleeved on the outer surfaces of the elastic columns, a square groove is provided in the middle of the bottom surface of the waterproof mobile phone case cavity, through slots are provided on the sides away from the square groove, grooves are provided on the sides adjacent to the through slots, the square buckle is engaged with the square groove, and the elastic columns and the springs both penetrate the through slots and extend into the grooves.

The present invention relates to a method of using a tightness self-checking device for a waterproof mobile phone protective case, which comprises the following steps:

- step 1, firstly preparing all accessories such as a pressing frame, retaining grooves, buckles, a fixing frame, a foldable soft rubber cavity, a pressing plate, a front transparent soft film, a front-mounted mobile phone case and a waterproof mobile phone case cavity;
- step 2: mounting, in a rotary manner, the pressing plate, the foldable soft rubber cavity, the fixing frame and the buckles with the retaining grooves in the pressing frame mounted on the front-mounted mobile phone case, so as to fix the foldable soft rubber cavity on the front side of the front-mounted mobile phone case;
- step 3: putting a mobile phone into the interior of the waterproof mobile phone case cavity, and engaging and fixing an edge-retaining ring mounted on the front side of the waterproof mobile phone case cavity with an edge-retaining groove on the rear side of the front-mounted mobile phone case, so as to fix the mobile phone inside the waterproof mobile phone case cavity and the front-mounted mobile phone case, thus making the mobile phone come into contact with the front transparent soft film; and
- step 4: before using the waterproof mobile phone case, firstly pressing the pressing plate to store the foldable soft rubber cavity inside the fixing frame, and mutually fixing the buckles on the fixing frame and the retaining grooves on the pressing frame in a buckling manner, so that the internal air is squeezed towards the front transparent soft film inside the front-mounted mobile phone case to cause it to bulge while the foldable soft rubber cavity is being folded and stored, and the bulging front transparent soft film keeps the air in the internal mold cavity from dissipating for a certain period of time, the mold cavity being in a sealed state, which is used to visually check the sealing effectiveness and safe use.

Compared with the prior art, the beneficial effects of the present invention are as follows.

By firstly pressing the pressing plate to store the foldable soft rubber cavity inside the fixing frame, and mutually fixing the buckles on the fixing frame and the retaining grooves on the pressing frame in a buckling manner, the internal air is squeezed towards the front transparent soft film inside the front-mounted mobile phone case to cause it to bulge while the foldable soft rubber cavity is being folded and stored. The bulging front transparent soft film keeps the air in the internal mold cavity from dissipating for a certain period of time and the mold cavity is in a sealed state, which is used to visually check the sealing effectiveness and safe use. Therefore, the waterproof mobile phone protective case has a tightness self-checking device, which is used for self-checking the waterproof tightness of the waterproof mobile phone protective case when in use. This effectively realizes that the waterproof mobile phone case is used under the condition of waterproof sealing performance, and at the same time, when the waterproof performance of the waterproof mobile phone case weakens or fails, it prevents the mobile phone from still being used due to the inability to make an accurate judgment in time, resulting in mobile phone damage by water inflow, and better improves the effective utilization of the waterproof mobile phone case product.

In the figures: 1. waterproof mobile phone case cavity; 2. front-mounted mobile phone case; 3. tightness self-checking mechanism; 301. pressing frame; 302. retaining groove; 303. buckle; 304. fixing frame; 305. foldable soft rubber cavity; 306. pressing plate; 307. front transparent soft film; 4. air squeeze space; 5. opening; 6. engagement mechanism; 601. edge-retaining ring; 602. edge-retaining groove; 7. square groove; 8. through slot; 9. groove; 10. square buckle; 11. movable arc buckle; 12. spring; 13. elastic column; 14. bottom groove; 15. nail rod.

DESCRIPTION OF THE EMBODIMENTS

The technical solution in the embodiments of the present invention will be clearly and completely described below in conjunction with the embodiments of the present invention; and obviously, the embodiments described are merely some, rather than all, of the embodiments of the present invention. On the basis of the embodiments of the present invention, all other embodiments obtained by those of ordinary skill in the art without creative efforts shall fall within the scope of protection of the present invention.

Figure 1:
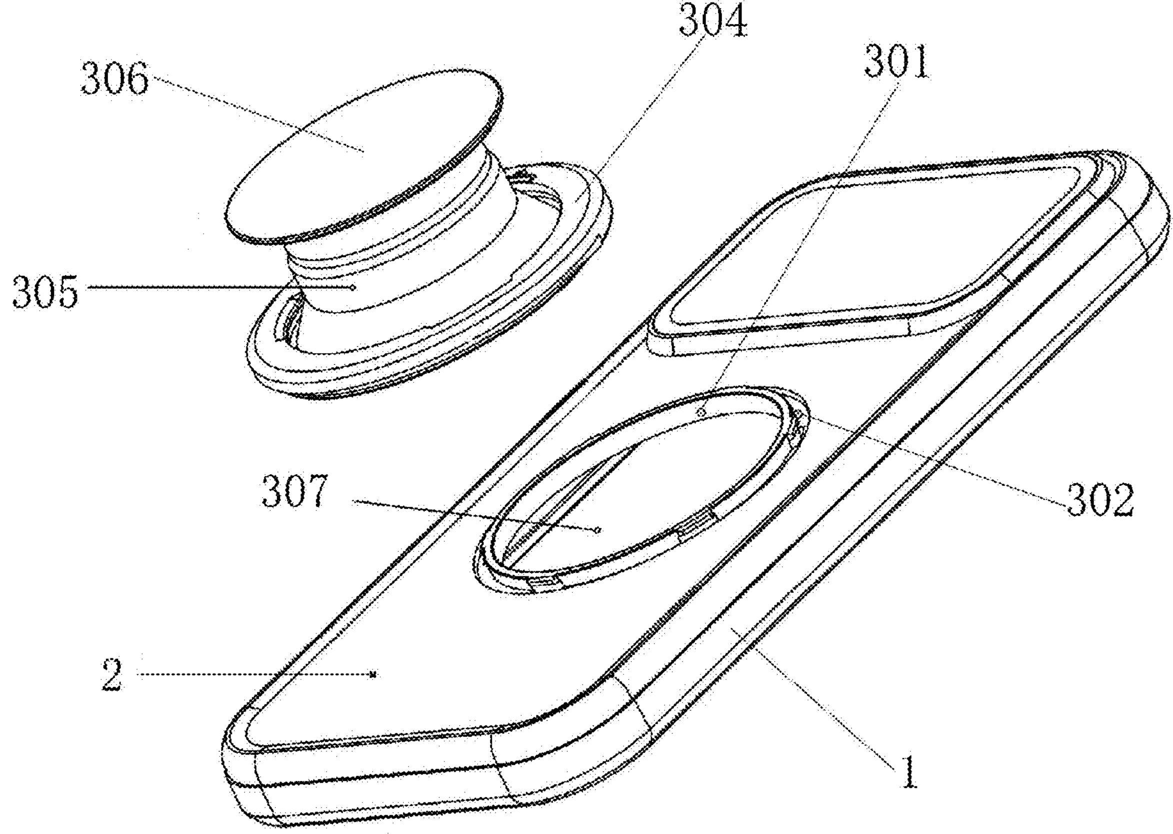
FIG. 1 is a three-dimensional assembly diagram of a device according to the present invention.
Figure 2:
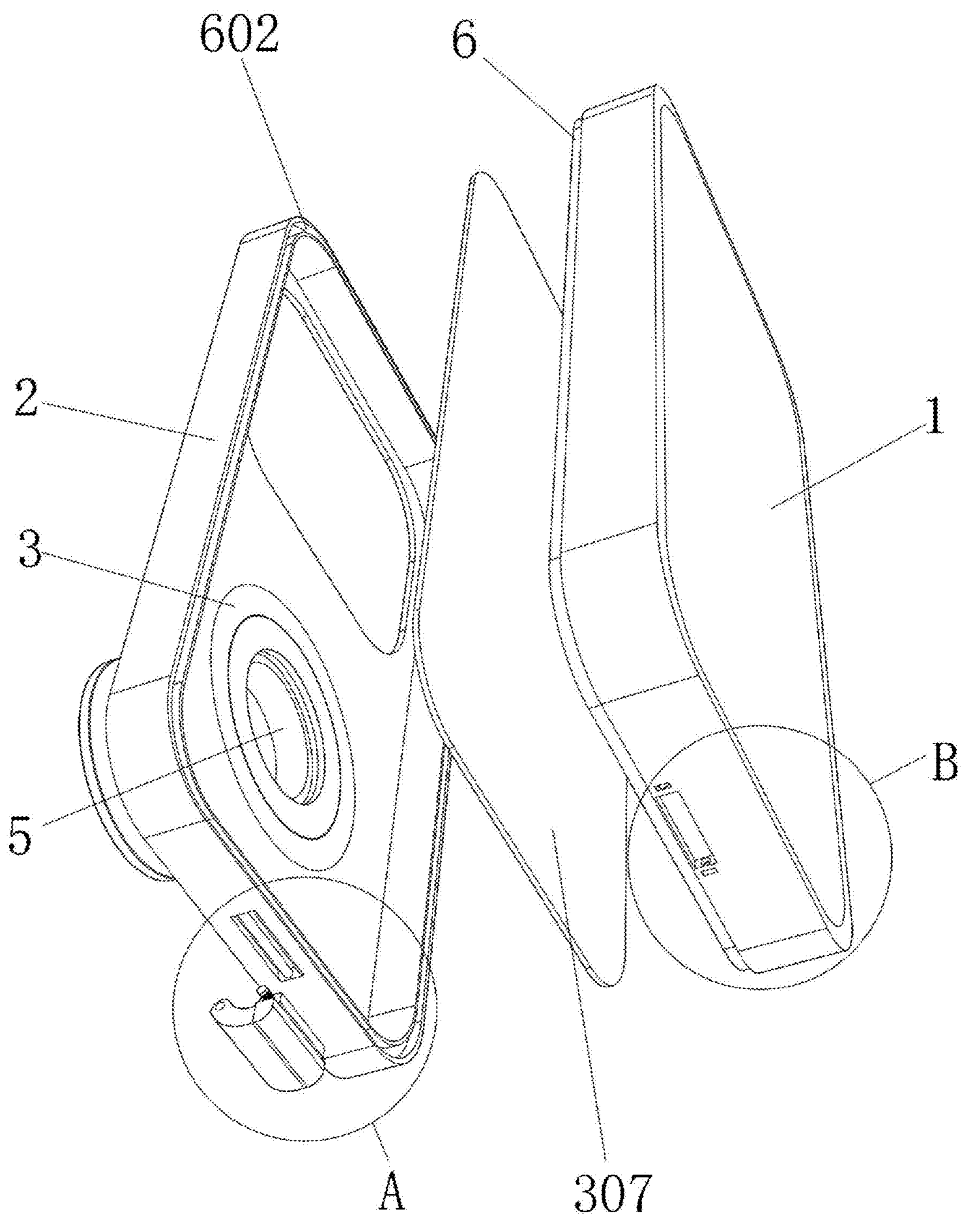
FIG. 2 is a three-dimensional disassembly diagram of a device according to the present invention.
Figure 3:
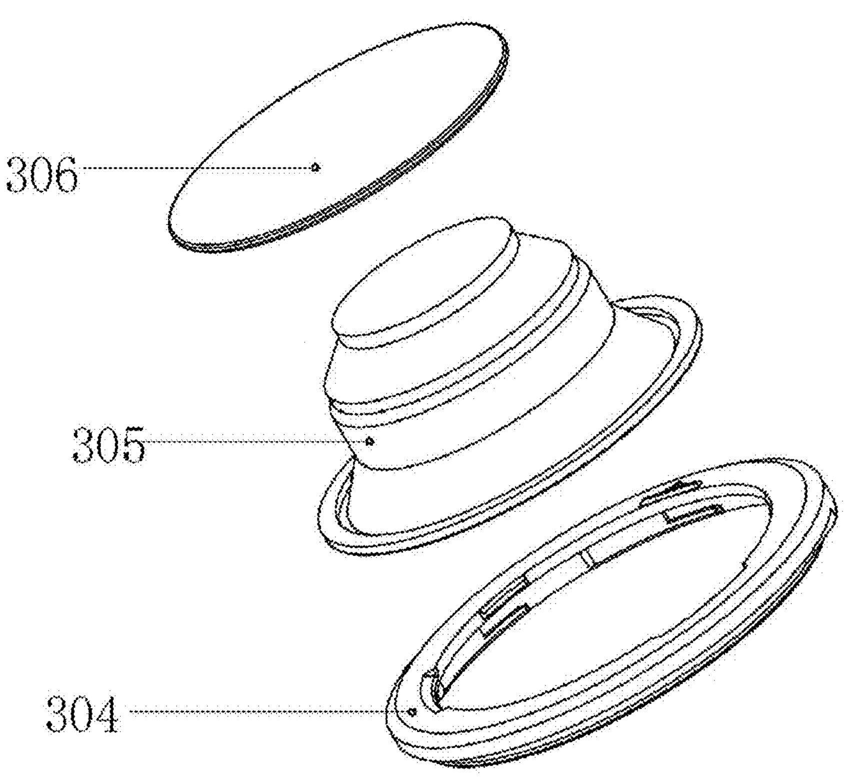
FIG. 3 is a three-dimensional exploded diagram of a structure according to the present invention.
Figure 4:
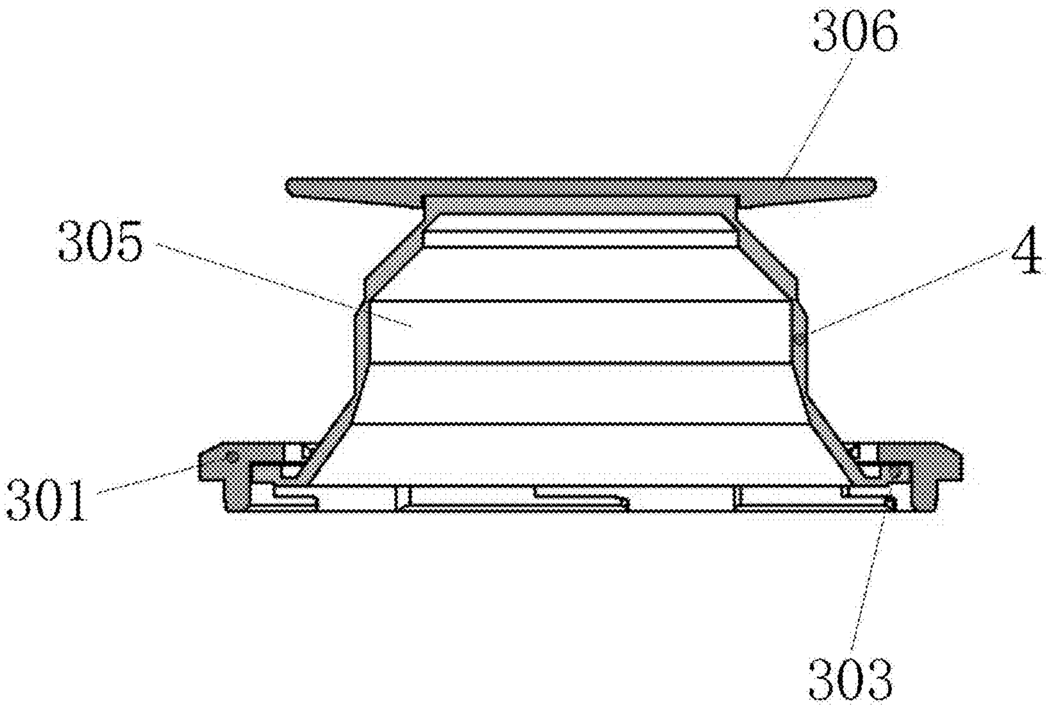
FIG. 4 is a cross-sectional diagram of a device according to the present invention.
Figure 5:
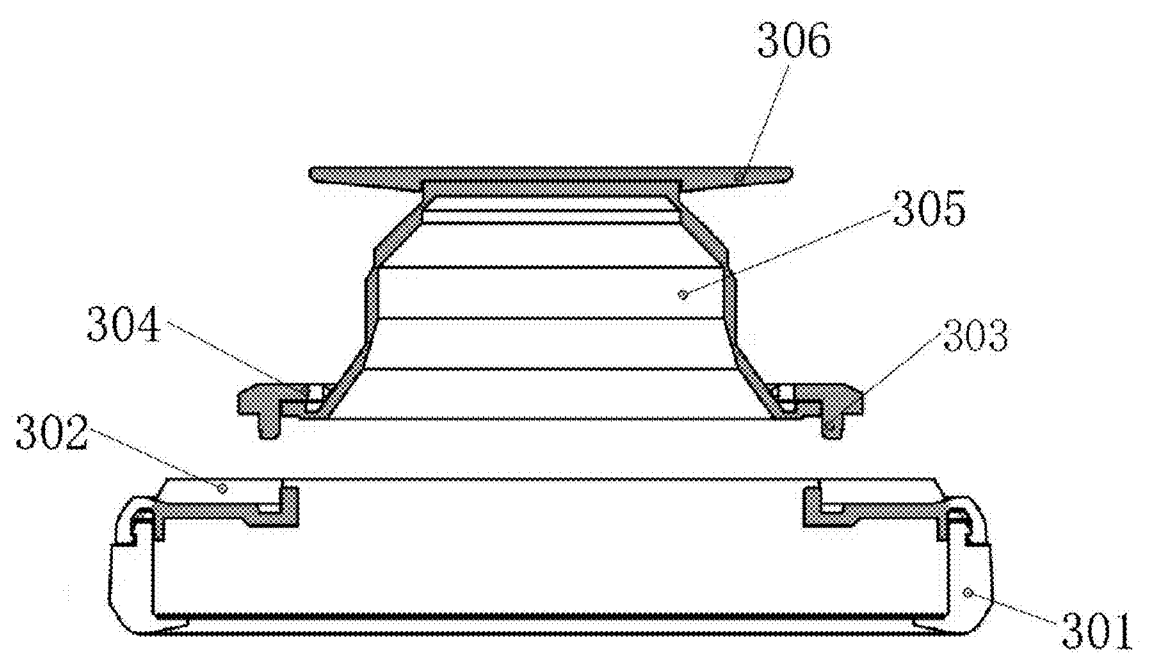
FIG. 5 is a cross-sectional diagram showing an assembling method according to the present invention.
Figure 6:
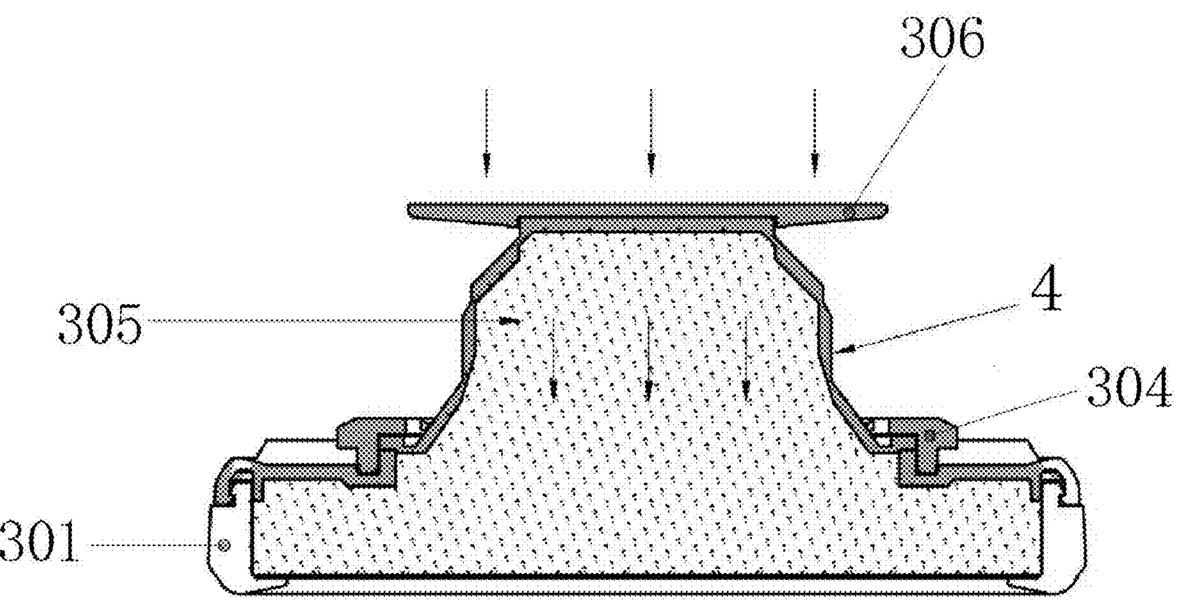
FIG. 6 is a diagram showing gas squeeze according to the present invention.
Figure 7:
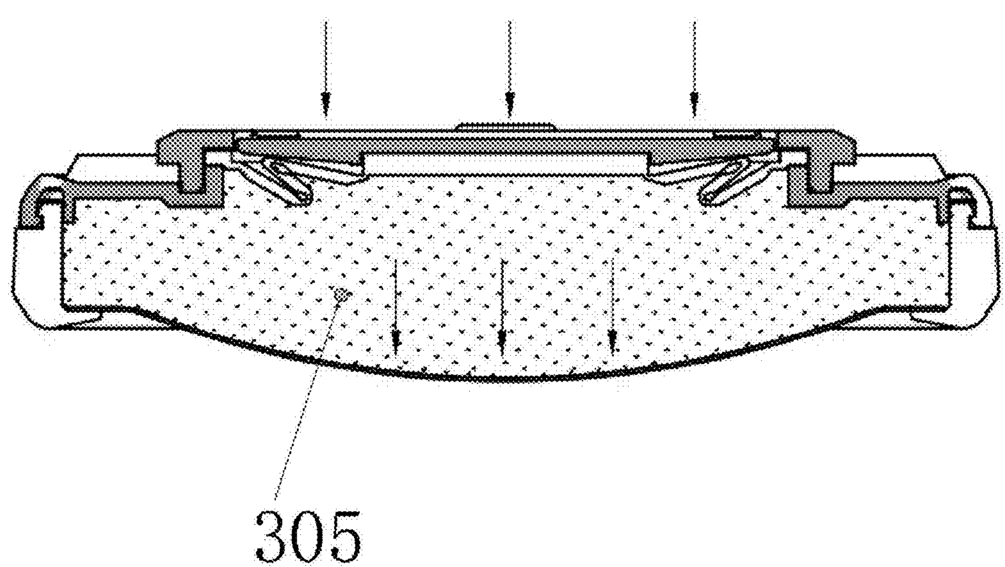
FIG. 7 is a diagram showing a transparent soft film that remains bulging due to internal pressure caused by pushing of a foldable soft rubber cavity according to the present invention.
Figure 8:
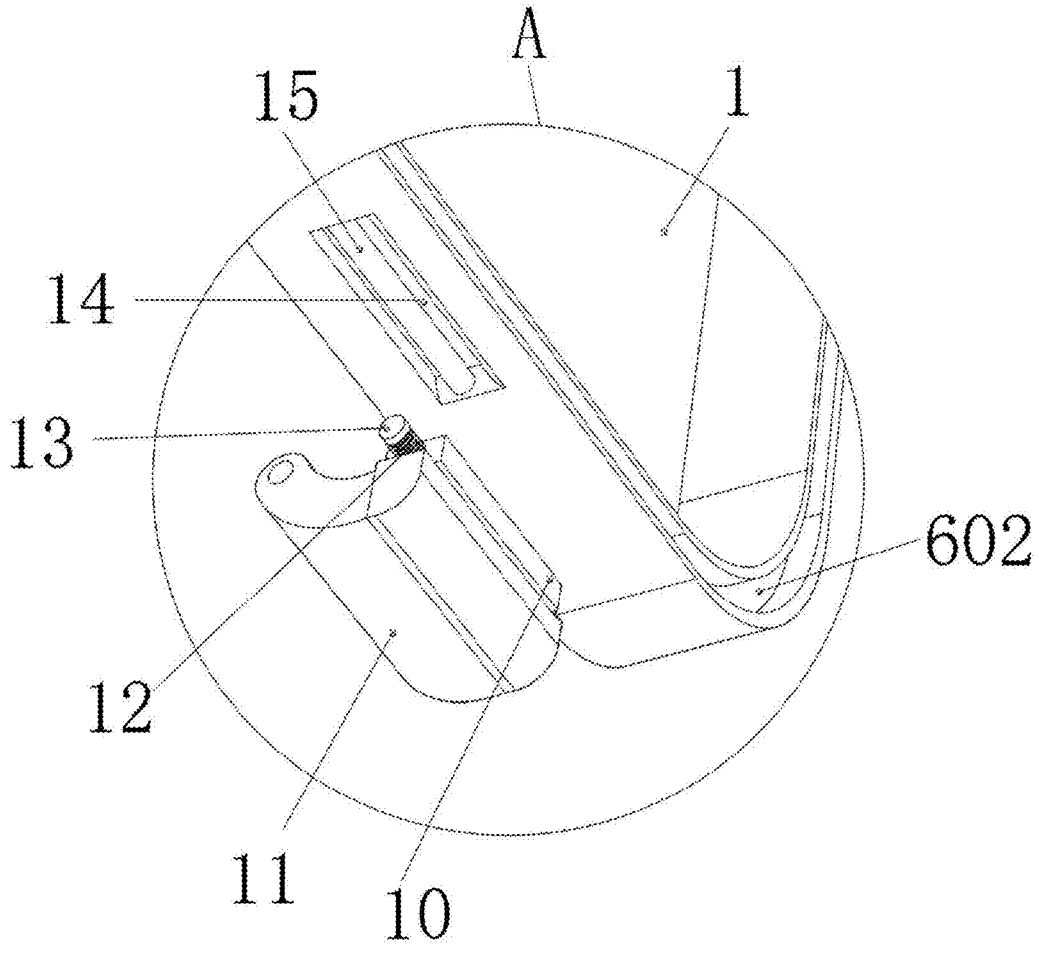
FIG. 8 is an enlarged diagram of part A in FIG. 2.
Figure 9:
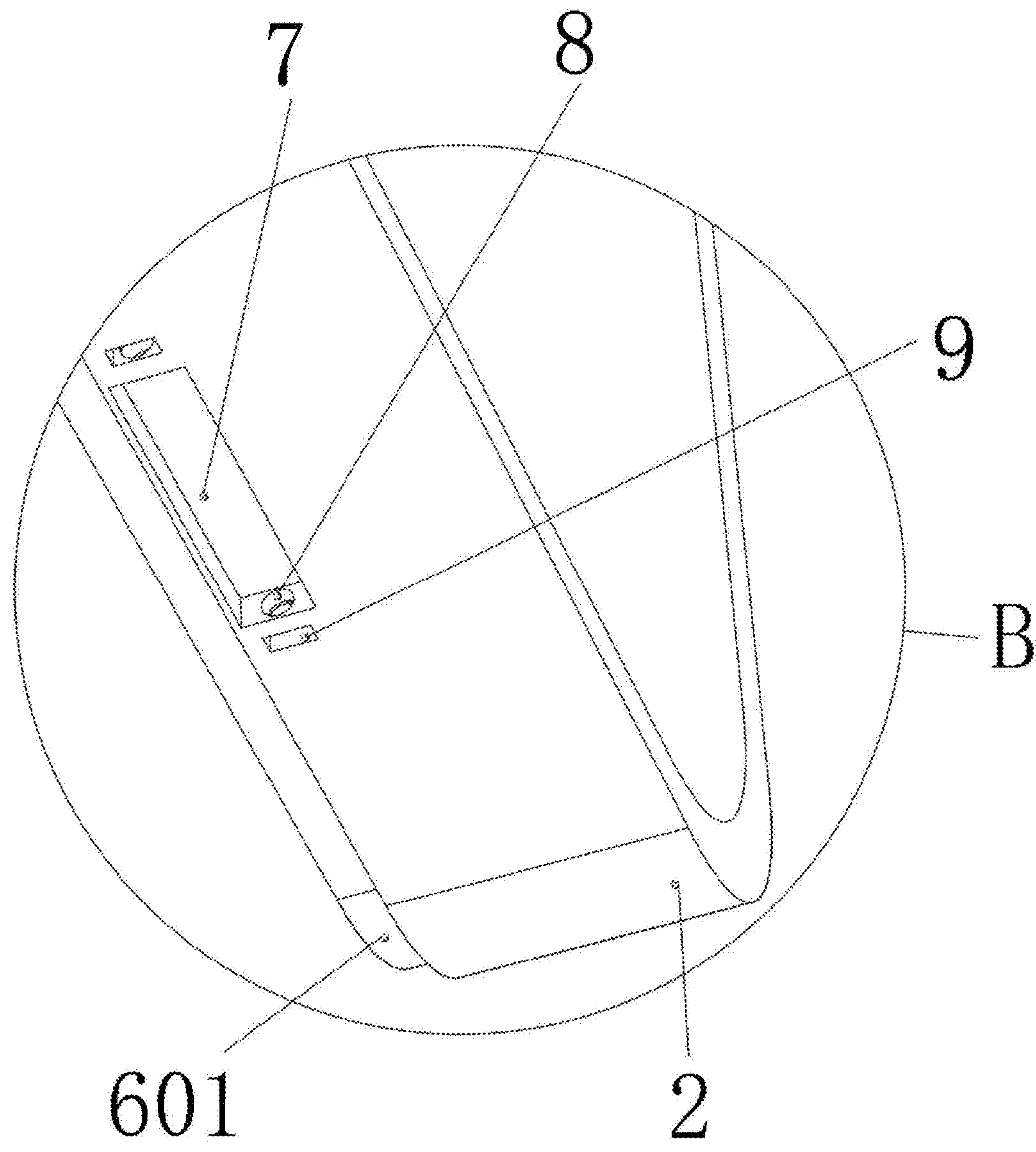
FIG. 9 is an enlarged diagram of part B in FIG. 2.
Figure 10:
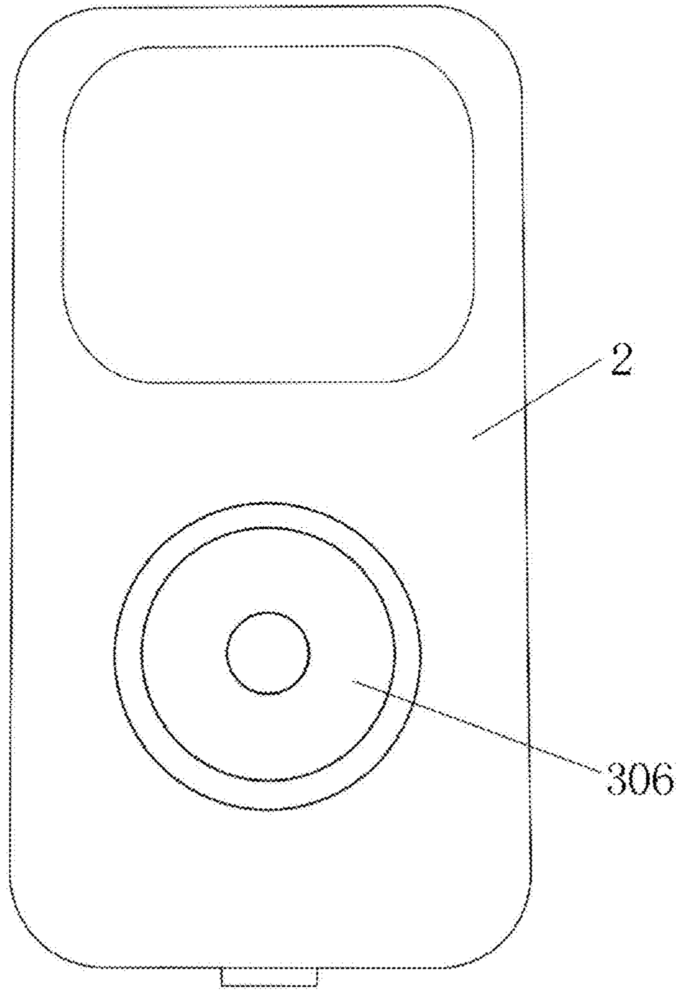
FIG. 10 is a three-dimensional front view of a device according to the present invention.

Referring to FIGS. 1-10, the present invention provides a tightness self-checking device for a waterproof mobile phone protective case, which includes a waterproof mobile phone case cavity 1. A front-mounted mobile phone case 2 is provided on the front side of the waterproof mobile phone case cavity 1. The lower part of the front-mounted mobile phone case 2 is provided with an opening 5. A tightness self-checking mechanism 3 is mounted inside the opening 5. An engagement mechanism 6 is mounted at the front edge of the waterproof mobile phone case cavity 1.

The tightness self-checking mechanism 3 includes a pressing frame 301, a fixing frame 304 and a front transparent soft film 307. The pressing frame 301 is placed inside the opening 5. A plurality of retaining grooves 302 are equidistantly provided in the front periphery of the pressing frame 301. The retaining grooves 302 are all engaged with buckles 303. The buckles 303 are all buckled at the inner edge of the fixing frame 304. A foldable soft rubber cavity 305 is fixedly connected to the front side of the fixing frame 304. A pressing plate 306 is fixedly connected to the front side of the foldable soft rubber cavity 305. A front transparent soft film 307 is mounted on the inner rear side of the front-mounted mobile phone case 2.

By firstly pressing the pressing plate 306 to store the foldable soft rubber cavity 305 inside the fixing frame 304, and mutually fixing the buckles 303 on the fixing frame 304 and the retaining grooves 302 on the pressing frame 301 in a buckling manner, the internal air is squeezed towards the front transparent soft film 307 inside the front-mounted mobile phone case 2 to cause it to bulge while the foldable soft rubber cavity 305 is being folded and stored. The bulging front transparent soft film 307 keeps the air in the internal mold cavity from dissipating for a certain period of time and the mold cavity is in a sealed state, which is used to visually check the sealing effectiveness and safe use. Therefore, the waterproof mobile phone protective case has a tightness self-checking device, which is used for self-checking the waterproof tightness of the waterproof mobile phone protective case when in use. This effectively realizes that the waterproof mobile phone case is used under the condition of waterproof sealing performance, and at the same time, when the waterproof performance of the waterproof mobile phone case weakens or fails, it prevents the mobile phone from still being used due to the inability to make an accurate judgment in time, resulting in mobile phone damage by water inflow, and better improves the effective utilization of the waterproof mobile phone case product.

The engagement mechanism 6 includes an edge-retaining ring 601. The edge-retaining ring 601 is mounted at the front edge of the waterproof mobile phone case cavity 1. The edge-retaining ring 601 is engaged with an edge-retaining groove 602. The edge-retaining groove 602 is provided at the rear edge of the front-mounted mobile phone case 2. With the arrangement of the edge-retaining ring 601 and the edge-retaining groove 602, the waterproof mobile phone case cavity 1 and the front-mounted mobile phone case 2 are engaged and fixed together to form a complete mobile phone case.

An air squeeze space 4 is formed between the foldable soft rubber cavity 305 and the front transparent soft film 307. The foldable soft rubber cavity 305 forces air to press against the front transparent soft film 307.

The pressing plate 306, the foldable soft rubber cavity 305, and the fixing frame 304 are arranged in sequence in front and back, thus forming a structure for self-checking the tightness of the mobile phone case.

The retaining grooves 302 and the buckles 303 are rotationally connected, and are engaged and fixed by rotating the buckles 303 on the fixing frame 304 into the retaining grooves 302.

The front transparent soft film 307 is squeezed by the foldable soft rubber cavity 305, thus bulging and contacting the mobile phone. With the foldable soft rubber cavity 305, the air is squeezed towards the front transparent soft film 307, and then the front transparent soft film 307 bulges, so that the mobile phone in the mobile phone case is in a sealed state.

A bottom groove 14 is provided in the middle of the bottom surface of the front-mounted mobile phone case 2. A nail rod 15 is provided inside the bottom groove 14. The nail rod 15 is rotatably connected to one side of a movable arc buckle 11. The other side of the movable arc buckle 11 is mounted with a square buckle 10. Elastic columns 13 are mounted on the sides away from the square buckle 10. Springs 12 are sleeved on the outer surfaces of the elastic columns 13. A square groove 7 is provided in the middle of the bottom surface of the waterproof mobile phone case cavity 1. Through slots 8 are provided on the sides away from the square groove 7. Grooves 9 are provided on the sides adjacent to the through slots 8. The square buckle 10 is engaged with the square groove 7. The elastic columns 13 and the springs 12 both penetrate the through slots 8 and extend into the grooves 9. By turning the movable arc buckle 11 to the square groove 7, the square buckle 10 is pushed into the square groove 7, and then the elastic columns 13 and springs 12 on both sides of the square buckle 10 extend into the through slots 8 and the grooves 9 for clamping and fixing, thereby reinforcing and fixing the front-mounted mobile phone case 2 and the waterproof mobile phone case cavity 1, and it is convenient to disassemble.

A method of using a tightness self-checking device for a waterproof mobile phone protective case, includes the following steps:

step 1, firstly preparing all accessories such as a pressing frame 301, retaining grooves 302, buckles 303, a fixing frame 304, a foldable soft rubber cavity 305, a pressing plate 306, a front transparent soft film 307, a front-mounted mobile phone case 2 and a waterproof mobile phone case cavity 1;

step 2: mounting, in a rotary manner, the pressing plate 306, the foldable soft rubber cavity 305, the fixing frame 304 and the buckles 303 with the retaining grooves 302 in the pressing frame 301 mounted on the front-mounted mobile phone case 2, so as to fix the foldable soft rubber cavity 305 on the front side of the front-mounted mobile phone case 2;

step 3: putting a mobile phone into the interior of the waterproof mobile phone case cavity 1, and engaging and fixing an edge-retaining ring 601 mounted on the front side of the waterproof mobile phone case cavity 1 with an edge-retaining groove 602 on the rear side of the front-mounted mobile phone case 2, so as to fix the mobile phone inside the waterproof mobile phone case cavity 1 and the front-mounted mobile phone case 2, thus making the mobile phone come into contact with the front transparent soft film 307; and step 4: before using the waterproof mobile phone case, firstly pressing the pressing plate 306 to store the foldable soft rubber cavity 305 inside the fixing frame 304, and mutually fixing the buckles 303 on the fixing frame 304 and the retaining grooves 302 on the pressing frame 301 in a buckling manner, so that the internal air is squeezed towards the front transparent soft film 307 inside the front-mounted mobile phone case 2 to cause it to bulge while the foldable soft rubber cavity 305 is being folded and stored, and the bulging front transparent soft film 307 keeps the air in the internal mold cavity from dissipating for a certain period of time, the mold cavity being in a sealed state, which is used to visually check the sealing effectiveness and safe use.

In the present invention, by firstly pressing the pressing plate 306 to store the foldable soft rubber cavity 305 inside the fixing frame 304, and mutually fixing the buckles 303 on the fixing frame 304 and the retaining grooves 302 on the pressing frame 301 in a buckling manner, the internal air is squeezed towards the front transparent soft film 307 inside the front-mounted mobile phone case 2 to cause it to bulge while the foldable soft rubber cavity 305 is being folded and stored. The bulging front transparent soft film 307 keeps the air in the internal mold cavity from dissipating for a certain period of time and the mold cavity is in a sealed state, which is used to visually check the sealing effectiveness and safe use. Therefore, the waterproof mobile phone protective case has a tightness self-checking device, which is used for self-checking the waterproof tightness of the waterproof mobile phone protective case when in use. This effectively realizes that the waterproof mobile phone case is used under the condition of waterproof sealing performance, and at the same time, when the waterproof performance of the waterproof mobile phone case weakens or fails, it prevents the mobile phone from still being used due to the inability to make an accurate judgment in time, resulting in mobile phone damage by water inflow, and better improves the effective utilization of the waterproof mobile phone case product.

Although the present invention has been described in detail with reference to the foregoing embodiments, for those skilled in the art, the technical solution recorded in the foregoing embodiments may still be modified, or some technical features therein may be equivalently replaced. Any modifications, equivalent replacements, improvements, and the like made within the spirit and principle of the present invention shall be included into the scope of protection of the present invention.

What is claimed is:

1. A tightness self-checking device for a waterproof mobile phone protective case, comprising:

a waterproof mobile phone case cavity, wherein a front-mounted mobile phone case is provided on a front side of the waterproof mobile phone case cavity, a lower part of the front-mounted mobile phone case is provided with an opening;

a tightness self-checking mechanism, is mounted inside the opening; and an engagement mechanism, is mounted at a front edge of the waterproof mobile phone case cavity;

wherein the tightness self-checking mechanism comprises a pressing frame, a fixing frame and a front transparent soft film, the pressing frame is placed inside the opening, retaining grooves are equidistantly provided in a front periphery of the pressing frame, the retaining grooves are all engaged with buckles, the buckles are all buckled at an inner edge of the fixing frame, a foldable soft rubber cavity is fixedly connected to a front side of the fixing frame, a pressing plate is fixedly connected to a front side of the foldable soft rubber cavity, and the front transparent soft film is mounted on an inner rear side of the front-mounted mobile phone case.

2. The tightness self-checking device for the waterproof mobile phone protective case according to claim 1, wherein the engagement mechanism comprises an edge-retaining ring, the edge-retaining ring is mounted at the front edge of the waterproof mobile phone case cavity, the edge-retaining ring is engaged with an edge-retaining groove, and the edge-retaining groove is provided at a rear edge of the front-mounted mobile phone case.

3. The tightness self-checking device for the waterproof mobile phone protective case according to claim 1, wherein an air squeeze space is formed between the foldable soft rubber cavity and the front transparent soft film.

4. The tightness self-checking device for the waterproof mobile phone protective case according to claim 1, wherein the pressing plate, the foldable soft rubber cavity, and the fixing frame are arranged in sequence in front and back.

5. The tightness self-checking device for the waterproof mobile phone protective case according to claim 1, wherein the retaining grooves and the buckles are rotationally connected.

6. The tightness self-checking device for the waterproof mobile phone protective case according to claim 1, wherein the front transparent soft film is squeezed by the foldable soft rubber cavity, thus bulging and contacting a mobile phone.

7. The tightness self-checking device for the waterproof mobile phone protective case according to claim 1, wherein a bottom groove is provided in a middle of a bottom surface of the front-mounted mobile phone case, a nail rod is provided inside the bottom groove, the nail rod is rotatably connected to one side of a movable arc buckle, another side of the movable arc buckle is mounted with a square buckle, elastic columns are mounted on sides away from the square buckle, springs are sleeved on outer surfaces of the elastic columns, a square groove is provided in a middle of a bottom surface of the waterproof mobile phone case cavity, through slots are provided on sides away from the square groove, grooves are provided on sides adjacent to the through slots, the square buckle is engaged with the square groove, and the elastic columns and the springs both penetrate the through slots and extend into the grooves.

* * * * *